United States Patent Office 3,647,882
Patented Mar. 7, 1972

3,647,882
PROCESS FOR THE MANUFACTURE OF ACETYLDEHYDE FROM VINYL ACETATE
Gunter Roscher, Kelkheim, Taunus, and Heinz Schmitz, Frankfurt am Main, Germany, assignors to Farbwerke Hoechst Aktiengesellschaft vormals Meister Lucius & Bruning, Frankfurt am Main, Germany
No Drawing. Filed May 16, 1968, Ser. No. 729,556
Claims priority, application Germany, May 27, 1967, F 52,529
Int. Cl. C07c *47/06*
U.S. Cl. 260—601 R                               6 Claims

ABSTRACT OF THE DISCLOSURE

Process for the production of acetaldehyde by hydrolysis of vinyl acetate in the presence of a compound containing chemically bound phosphorus, e.g. free phosphoric acids, heteropolyacids thereof, acid salts of these acids and mixtures of phosphoric acids with compounds of the elements of subgroup V or VI of the Mendeléeff Periodic Table as catalysts.

---

The present invention relates to a process for the manufacture of acetaldehyde from vinyl acetate.

Various technical processes have been proposed for the manufacture of acetaldehyde. According to one known method acetaldehyde is obtained, for example, by the oxidation of ethylene in the liquid phase using palladium salts as catalysts. Another known process consists in an addition reaction of water with acetylene in the presence of mercury salts as catalysts. A large proportion of the industrially obtained acetaldehyde is used for the manufacture of acetic acid. Acetaldehyde generally contains a number of by-products originating from its synthesis, for example, methyl acetate or organic chlorine compounds, which are also contained in the acetic acid obtained by subsequent oxidation. A quantitative separation of the by-products from the acetaldehyde or the acetic acid is difficult and requires a considerable amount of expenditure. A small content of impurities in the acetic acid to be used industrially is not, in general, disturbing. For the manufacture of monomers to be polymerized, for example vinyl acetate, very pure acetic acid has hitherto been used, however, because even slightest amounts of impurities in the monomers strongly reduce their polymerizability.

A new process for the manufacture of vinyl acetate from ethylene, oxygen and acetic acid in the presence of various catalysts in the gaseous phase could be rendered much more economic if cheaper acetic acid which has been less after-purified could be used as starting material. This can be achieved if acetaldehyde that is already free from by-products is used for the manufacture of acetic acid or if the impurities contained in the acetaldehyde are identical with the by-products obtained in the synthesis of vinyl acetate.

A possibility of obtaining acetaldehyde which can be oxidized to acetic acid by a known technical process in the liquid phase with the use of manganese acetate or cobalt acetate as the catalyst, consists in hydrolyzing vinyl acetate with water or aqueous acids to acetaldehyde and acetic acid. This hydrolysis can be carried out according to several known methods. It is possible to use, for example, aqueous mineral acids, for example, sulfuric acid, hydrochloric acid or phosphoric acid or aqueous solutions of salts, for example, palladium chloride or copper chloride. But even with mineral acids, the hydrolysis proceeds slowly and is only complete if the acetaldehyde which forms is continuously removed from the liquid reaction mixture, for example, by distillation. These conditions of hydrolysis, however, favor considerably a further reaction of the resulting acetaldehyde to crotonaldehyde.

Another disadvantage of the hydrolysis in the liquid phase is that the mineral acid used is consumed with the formation of other undesirable by-products and must be continuously replaced gradually as it is consumed.

No economic process for the hydrolysis of vinyl acetate to acetaldehyde has therefore been known so far.

The present invention provides a process for the manufacture of acetaldehyde by hydrolysis of vinyl acetate which comprises conducting vinyl acetate together with acetic acid, water, ethylene and, if desired, oxygen and/or inert gases in the gaseous phase over catalysts containing phosphoric acids, the heteropolyacids thereof, acid salts of these acids with metals of groups 1 to 5 of Mendeléeff Periodic Table or with manganese, iron, cobalt or nickel, provided that the said acid salts are not volatile under the reaction conditions, mixtures of these compounds and/or mixtures of phosphoric acids with compounds of the elements of sub-group 5 or 6 of the Mendeléeff Periodic Table. By this process in which vinyl acetate is converted into acetaldehyde by hydrolysis in an economical manner, only acetic acid (obtained by the oxidation of acetaldehyde) and traces of ethyl acetate and crotonaldehyde are obtained as by-products.

A common feature of the catalysts is their content of chemically bound phosphorus. There may be used free phosphoric acids, for example, pyro-, meta- and polyphosphoric acid, and advantageously ortho-phosphoric acid. There may also be used phosphorus containing heteropolyacids, for example, phosphomolybdic acid and phosphotungstic acid. Acid salts of these acids that are not volatile under the reaction conditions may also be used, for example, the acid alkali metal-, alkaline earth metal-, iron-, cobalt- or nickel salts of phosphoric acids or heteropolyacids containing phosphorus. There may also be used acid salts of these acids with metals of sub-group 1 or 2 of the Mendeléeff Periodic Table, for example, copper or zinc, or acid salts with metals of sub-groups 3 to 7 of the Mendeléeff Periodic Table, for example, titanium and manganese. It is furthermore possible to use phosphoric acid or an acid salt thereof in admixture with varying amounts of compounds, advantageously oxides or oxyhydrates, of the metals of sub-groups 5 and 6 of the Mendeléeff Periodic Table, advantageously vanadium, chromium, molybdenum and tungsten.

It is also possible to use any desired mixture of the above compounds.

The catalysts or catalyst mixtures containing phosphorus are advantageously supported on carriers. Examples of suitable carriers are silicic acid, active carbon, pumice, aluminum oxide, titanium dioxide and other substances known as carriers.

Temperatures and pressures of the hydrolysis are not critical. In industry, it is advantageous, however, to use temperatures within the range of from 150 to 250° C., advantageously from 160 to 210° C., and atmospheric or superatmospheric pressure of, for example, up to 40 atmospheres.

The mixtures to be used for the reaction in accordance with the invention may contain varying amounts of vinyl acetate, ethylene and acetic acid. Advantageously mixtures containing 5 to 20 mol percent vinyl acetate, 5 to 50 mol percent acetic acid and 10 to 70 mol percent ethylene are used. The molar amount of water required for the hydrolysis is advantageously at least equal to the molar amount of the vinyl acetate to be hydrolyzed.

The reaction may be carried out in the absence of oxygen. The gaseous starting substances may, however, also contain oxygen, for example, in an amount of 0 to 20 mol percent.

The gaseous starting substances may also contain varying amounts of gases that are inert under the reaction conditions, for example, nitrogen or carbon dioxide. Nitrogen is always present when oxygen in the form of air is used.

The reaction mixtures obtained by the hydrolysis are worked up in known manner, for example by condensation of the constituents that are liquefiable under normal conditions and subsequent separation by distillation.

The smooth formation of acetaldehyde under the hydrolysis conditions in accordance with the invention could not be foreseen. The acetaldehyde formed would rather be expected to react further, instantly and to a high degree, to crotonaldehyde. As is known, crotonaldehyde can readily be obtained, for example, by passing acetaldehyde over acid catalysts in the gaseous phase. It is therefore surprising that the formation of crotonaldehyde is only very small under the conditions in accordance with the invention.

In a preferred mode of executing the process of the invention, the hot gas mixtures leaving the reaction zone of the manufacture of vinyl acetate from ethylene, oxygen and acetic acid in the presence of solid catalysts, are passed directly over the catalyst containing phosphorus.

It may be particularly advantageous in this case to introduce the hot gas mixture coming from the reaction zone of the manufacture of vinyl acetate, into a distillation column after it has been conducted over the hydrolysis catalyst containing phosphorus. The temperature in the column is controlled such that the acetaldehyde formed is distilled at the head of the column together with uncondensable gases, for example, ethylene, oxygen, nitrogen and $CO_2$, while the acetic acid that has been recovered by the hydrolysis of the vinyl acetate, the acetic acid that has already been present in the starting mixture, and the acetic acid that has newly been formed by the oxidation of acetaldehyde with oxygen are drawn off in a pure form at the sump of the column.

This simple way of separating the components renders the process for the manufacture of acetaldehyde particularly economic.

It is a particular advantage that the process for the hydrolytic splitting of vinyl acetate to acetaldehyde can be coupled with the manufacture of vinyl acetate in a manner such that in a single plane there can be obtained, at will, exclusively vinyl acetate or exclusively acetaldehyde and acetic acid or all three compounds simultaneously. In the last mentioned case the ratio of vinyl acetate to acetaldehyde can be adjusted as desired while the amount of acetic acid which is formed by the oxidation reaction of the acetaldehyde with the oxygen which may be present, is generally rather constant depending on the catalyst used. The ratio of vinyl acetate:acetaldehyde can easily be adjusted as desired by introducing only a partial stream of the gas mixture leaving the vinylation reactor into the hydrolysis zone. By proceeding in this manner, it is possible, for example, to obtain in a simple way only such an amount of acetaldehyde as is needed for covering the amount of acetic acid necessary for the formation of vinyl acetate if it is intended to make only vinyl acetate in the plant. By passing the whole gas stream leaving the vinylation reactor over the hydrolysis catalyst it is also possible to obtain exclusively acetaldehyde, a certain amount of the acetaldehyde being generally converted into acetic acid. The process of the invention therefore enables vinyl acetate or acetaldehyde or acetaldehyde and acetic acid or vinyl acetate and acetaldehyde or vinyl acetate, acetaldehyde and acetic acid to be obtained at will in a single plant from ethylene and oxygen, and it is only the amount of acetic acid that cannot be adjusted at will.

It was particularly surprising that the above mixtures obtained in the manufacture of vinyl acetate from ethylene, acetic acid and oxygen, which contain water only in a stoichiometric ratio or a ratio somewhat exceeding the latter with respect to vinyl acetate because only one mol water is formed for each mol vinyl acetate in the formation of vinyl acetate from ethylene, oxygen and acetic acid, are almost quantitatively reacted to acetaldehyde (and acetic acid) by the hydrolysis in accordance with the invention. By proceeding in accordance with the invention, the residual gas mixture is substantially anhydrous after the hydrolysis of the vinyl acetate whereas it would have been expected that the ethylene would additively combine with the acetic acid to form ethyl acetate under the influence of the acid catalysts used. The formation of ethyl acetate is, however, only very small even when working under elevated pressure, this being surprising.

It is furthermore surprising that only slight amounts of carbon monoxide and carbon dioxide are formed under the action of the catalysts in accordance with the invention when oxygen is present in the reaction mixture, although the ratio between oxygen and acetaldehyde formed is often high and the oxygen may also be present in an excess amount with respect to the acetaldehyde. The formation of carbon oxides from acetaldehyde and oxygen would therefore be expected since it is known that acetaldehyde reacts with oxygen already at relatively low temperatures in the absence of catalysts to yield acetic acid with the simultaneous formation of small amounts of carbon dioxide. However, substantially no carbon oxides are found in the reaction mixture in particularly favorable cases, but almost quantitative yields of acetaldehyde and acetic acid formed by further oxidation of acetaldehyde, are obtained. The formation of carbon oxides would also be expected as a result of the action of oxygen on the ethylene which is always present in considerable amounts in the reaction mixture because a marked oxidation of ethylene to carbon dioxide and water already takes place when ethylene is passed with small amounts of oxygen over acid phosphorus-containing catalysts at elevated temperatures.

As also with the concomitant use of only stoichiometric amounts or amounts only somewhat larger, calculated on the vinyl acetate, of water, the vinyl acetate is almost quantitatively reacted in the desired manner, this being surprising, the mixture obtained by cooling the reaction gas mixture leaving the hydrolysis zone contain substantially only acetic acid and acetaldehyde. In a single distillation column, pure acetaldehyde can be distilled from the condensed liquid mixtures at the head of the column while technically pure acetic acid containing only slight amounts of water, generally less than 1%, can be removed at the sump of the column.

The following examples serve to illustrate the invention, but are not intended to limit it. In the examples, the following plant was used:

A heat-insulated reaction tube, 2.5 m. long and 2.5 cm. in diameter, was surrounded by a jacket which could be heated, if desired, with steam. Before the reaction tube, a condenser which could be heated with high pressure steam was disposed. The feed pipe for the reaction tube was connected such that the starting substances could also be introduced into the reaction tube without being passed through the condenser. After the reactor a series-connected cooling system of water-cooling brine-acetone/ Dry Ice was disposed. When working under pressure, only the water cooling was used.

The terms "$Nm.^3$" and "$Nl$" are used in the examples to mean cubic meters and liters, respectively, measured under normal conditions of temperature and pressure.

EXAMPLE 1

(a) 400 grams silicic acid in the form of small particles about 15 millimeters long and 4 millimeters in diameter were impregnated with 400 grams aqueous phosphoric acid of 50% strength. The catalyst was then dried at 150° C. 1 liter of the dried catalyst was introduced into the reaction tube. The temperature in the reaction tube was adjusted to 200° C. by heating with steam. 800 grams acetic acid, 200 grams vinyl acetate, 46 grams water and 1 Nm.$^3$ ethylene were then passed, per hour, in vapor form over the catalyst under atmospheric pressure. 980 to 1000 grams liquid products were obtained per hour. The liquid product contained 93.3% acetic acid, 6.3% acetaldehyde, 0.4% water, 0.02% crontonaldehyde, 0.04% vinyl acetate and 0.04% ethyl acetate. The residual gas remaining after cooling with acetone and Dry Ice still contained 1.8 to 2.1% by volume acetaldehyde.

Hence, more than 99.5% of the vinyl acetate used as starting material had been hydrolyzed. The extent of conversion of acetaldehyde formed to crotonaldehyde was 0.2%. The space/time yield of acetaldehyde was about 100 grams per liter and per hour.

(b) The test conditions were the same as those indicated sub (a), with the exception that the temperature in the reactor was 180° C. The condensate mixture obtained still contained 0.12% unreacted vinyl acetate. 0.6% of the vinyl acetate used as starting product had not been hydrolyzed.

(c) The mode of procedure was the same as that described in Example 1(a) and 1(b). The temperature in the reactor was 196° C. The pressure in the reactor was kept at 5 atmospheres gage. 1500 grams acetic acid, 400 grams vinyl acetate, 90 grams water and 1.5 Nm.$^3$ ethylene were passed, per hour, in the gaseous state over the catalyst. The gas mixture leaving the reactor was cooled only with water under a pressure of 5 atmospheres gage. 1900 grams liquid product were obtained per hour. After the dissolved ethylene had left the liquid in the gaseous form after relieving from tension, the condensate solution contained 91% acetic acid, 8% acetaldehyde, 0.4% water, 0.1% vinyl acetate, 0.1% ethyl acetate and 0.05% crontonaldehyde. The residual gas which could not be condensed still contained 1.5% by volume acetaldehyde. The space/time yield of acetaldehyde was 200 grams per liter and per hour.

(d) The mode of procedure was the same as that described in Example 1(c). The reaction temperature was 200° C. 1500 grams acetic acid, 400 grams vinyl acetate, 90 grams water, 1.0 Nm.$^3$ ethylene and 0.5 Nm.$^3$ air were passed, per hour, in the gaseous state over the catalyst under a pressure of 5 atmospheres gage. After cooling the gas mixture, the residual gas which could not be condensed first contained about 0.3% by volume $CO_2$ and 0.1% by volume CO, that is 2.9% of the acetaldehyde formed was oxidized. After reacting for about 8 hours no more $CO_2$ was formed. 1960 grams liquid product were obtained per hour. The product contained 93.0% acetic acid, 6% acetaldehyde, 0.5% water, 0.05% crotonaldehyde, 0.1% ethyl acetate and 0.1 vinyl acetate. The residual gas still contained about 1.3% by volume acetaldehyde. About 17% of the acetaldehyde formed had been converted into acetic acid. The space/time yield of acetaldehyde was about 165 grams per liter and per hour. The space/time yield of acetic acid obtained by oxidation was about 45 grams per liter and per hour.

(e) A gas mixture having a temperature of 210° C. left a reaction zone in which vinyl acetate had been obtained in the gaseous phase from acetic acid, ethylene and oxygen. The amount was 4230 grams per huor. The gas mixture had the following composition in mol percent: 61% ethylene, 24% acetic acid, 5.7% water, 4.8% vinyl acetate, 3.1% oxygen, 0.9 carbon dioxide and 0.06 acetaldehyde. The gas mixture was passed over the hydrolysis catalyst as described in Example 1(d), but without being conducted through the condenser disposed before the hydrolysis reactor. The reactor was first after-heated with steam to prevent condensation of acetic acid at the beginning of the experiment. The heating was then switched off. After stationary test conditions had been established, the temperature at the outlet of the reactor was about 190° C. 2.1 kilograms liquid product were obtained per hour. The product contained 92% acetic acid, 6.7% acetaldehyde, 0.9% water, 0.1% vinyl acetate, 0.05% crotonaldehyde and 0.2 ethyl acetate, the percents being by weight. The mixture of residual gas contained 93.5% by volume ethylene, 1.4% by volume $CO_2$, 3.8% by volume $O_2$ and 1.3% by volume acetaldehyde.

It could be calculated from the increase of $CO_2$ that less than 1% acetaldehyde had been oxidized to $CO_2$. Over 99% of the vinyl acetate had undergone reaction. About 11% of the acetaldehyde formed was further oxidized to acetic acid. The space/time yield of acetaldehyde was about 200 grams per liter and per hour, that of acetic acid about 40 grams per liter and per hour.

EXAMPLE 2

(a) The mode of procedure was the same as that described in Example 1. The amount of catalyst introduced was 1 liter. The catalyst consisted of small particles of silicic acid, about 15 millimeters long and 4 millimeters in diameter, which were impregnated with an aqueous solution of phosphomolybdic acid (100 grams phosphomolybdic acid per 500 grams silicic acid carrier). The test conditions were the same as those used in Example 1(a). About 1000 grams condensate were obtained per hour. The condensate contained 93% acetic acid, 6.1% acetaldehyde, 0.4% vinyl acetate, 0.4% water, 0.02% crotonaldehyde and 0.1 ethyl acetate. 98% of the vinyl acetate used had been hydrolyzed. The extent of conversion of acetaldehyde to crotonaldehyde was 0.1%.

(b) The test conditions were the same as in Example 1(c). The hydrolysis of vinyl acetate was substantially quantitative. The liquid product obtained contained 91% acetic acid, 8% acetaldehyde, 0.4% water, 0.15% ethyl acetate and 0.07% crotonaldehyde.

(c) The test conditions were the same as those indicated in Example 1(d). About 1950 grams condensate were obtained per hour. The condensate consisted of 92% by weight acetic acid, 7% by weight acetaldehyde, 0.9% by weight water, 0.1% by weight ethyl acetate and 0.05% by weight crotonaldehyde. The residual gas contained about 66% ethylene, 26% nitrogen, 5.0% oxygen, 0.8 carbon dioxide, 0.1% carbon monoxide and 1.3% acetaldehyde. The reaction of vinyl acetate was substantially quantitative. 6 of the acetaldehyde formed was oxidized to $CO_2$ and CO. 9.5% was converted into acetic acid.

EXAMPLE 3

The mode of procedure was the same as that described in Example 1. 1 liter catalyst was introduced. The catalyst consisted of small partciles of silicic acid which had been impregnated with a solution of manganese acetate/cobalt acetate, dried and then impregnated with aqueous phosphoric acid. 500 grams of impregnated silicic acid carrier contained 45 grams manganese acetate, 45 grams cobalt acetate and 200 grams phoshporic acid.

The test conditions were the same as those used in Example 1(d). About 1970 grams liquid product were obtained per hour. The liquid product contained 92.8% by weight acetic acid, 2.1% by weight water, 4.9% by weight acetaldehyde, 0.1% by weight ethyl acetate, 0.04% by weight crotonaldehyde and 0.05% by weight vinyl acetate. The residual gas, which amounted to about 1485 Nl. per hour, contained 66.5% by volume ethylene, 26.6% $N_2$, 3.0% $O_2$, 2.8% $CO_2$, 0.1% CO and 10% acetaldehyde. Over 99% of the vinyl acetate used as starting material had been hydrolyzed. 21% of the acetaldehyde formed was oxidized to $CO_2$ and CO. 18% of the acetaldehyde was converted into acetic acid.

What is claimed is:

1. A process for the manufacture of acetaldehyde by hydrolysis of vinyl acetate which comprises: conducting a mixture consisting essentially of vinyl acetate in from 5 to 20 mol percent, acetic acid in from 5 to 50 mol percent, water, ethylene in from 10 to 70 mol percent and 0 to 20% oxygen in the gaseous phase, over a catalyst containing a compound containing chemically bound phosphorus, selected from the group consisting of phosphoric acids, heteropoly-acids thereof, acid metal salts of these acids which is not volatile under the reaction conditions and mixtures of these compounds, the metal in the said acid metal salts being selected from the group consisting of metals of groups I to V of the Mendeléeff Periodic Table, manganese, iron, cobalt and nickel.

2. The process of claim 1 wherein the catalyst is o-phosphoric acid.

3. The process of claim 1 wherein the catalyst is phosphomolybdic acid.

4. The process of claim 1 wherein the catalyst is a mixture of a phosphoric acid with a compound of the elements of sub group V or VI of the Mendeléeff Periodic Table.

5. The process of claim 1 wherein the catalyst containing phosphorous is supported on a carrier.

6. A process for the manufacture of acetaldehyde by hydrolysis of vinyl acetate which comprises: conducting a hot gaseous mixture leaving the reaction zone of a process for the manufacture of vinyl acetate from ethylene, oxygen and acetic acid and containing vinyl acetate in from 5 to 20 mol percent together with acetic acid in from 5 to 50 mol percent, water, and ethylene in from 10 to 70 mol percent, over a catalyst containing a compound containing chemically bound phosphorus, selected from the group consisting of a phosphoric acid, a heteropolyacid thereof, an acid metal salt of these acids which is not volatile under the reaction conditions and mixtures of these compounds, the metal in said acid metal salts being selected from the group consisting of metals of groups I, II, IV, and V of the Mandeléeff Periodic Table, manganese, iron, cobalt and nickel.

References Cited
UNITED STATES PATENTS

| | | | |
|---|---|---|---|
| 3,300,528 | 1/1967 | Wakasa et al. | 260—497 |
| 3,275,680 | 9/1966 | Holzrichter et al. | 260—604 X |
| 1,714,783 | 5/1929 | Herrmann et al. | 260—601 |

BERNARD HELFIN, Primary Examiner

R. H. LILES, Assistant Examiner

U.S. Cl. X.R.

260—497 A